United States Patent
Castle et al.

(10) Patent No.: US 8,901,797 B2
(45) Date of Patent: Dec. 2, 2014

(54) BRUSHLESS MOTOR SYSTEM FOR A VEHICLE FUEL PUMP

(75) Inventors: Harold L. Castle, Dexter, MI (US); David M. Dokas, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1147 days.

(21) Appl. No.: 12/021,740

(22) Filed: Jan. 29, 2008

(65) Prior Publication Data

US 2009/0189473 A1    Jul. 30, 2009

(51) Int. Cl.
| | | |
|---|---|---|
| H02K 1/10 | (2006.01) | |
| H02K 1/00 | (2006.01) | |
| H02K 15/12 | (2006.01) | |
| H02K 1/04 | (2006.01) | |
| H02K 3/52 | (2006.01) | |
| H02K 3/32 | (2006.01) | |
| H02K 15/095 | (2006.01) | |
| H02K 3/28 | (2006.01) | |

(52) U.S. Cl.
CPC .................. H02K 15/12 (2013.01); H02K 1/04 (2013.01); H02K 3/522 (2013.01); H02K 3/325 (2013.01); H02K 15/095 (2013.01); H02K 3/28 (2013.01)

USPC ............ 310/186; 310/179; 310/184; 310/185

(58) Field of Classification Search
CPC .................................. H02K 1/00; H02K 1/10
USPC ......... 310/186, 179, 184–185, 201, 207, 218, 310/259
See application file for complete search history.

(56) References Cited

U.S. PATENT DOCUMENTS

| | | | | |
|---|---|---|---|---|
| 6,335,582 | B1* | 1/2002 | Abukawa et al. | 310/214 |
| 6,472,790 | B2* | 10/2002 | Rose, Sr. | 310/184 |
| 6,784,584 | B2* | 8/2004 | Knoll et al. | 310/179 |
| 2006/0022544 | A1* | 2/2006 | Kinashi | 310/179 |

OTHER PUBLICATIONS

Webster's II New Riverside University Dictionary, 1984, The Riverside Publishing company, p. 513 and p. 1215.*

* cited by examiner

*Primary Examiner* — Tran Nguyen
*Assistant Examiner* — Jose Gonzalez Quinones
(74) *Attorney, Agent, or Firm* — Julia Voutyras; Brooks Kushman P.C.

(57) ABSTRACT

A rotor for a brushless motor is resistant to degradation in alternative fuels and has desirable magnetic properties. A stator for a brushless DC motor includes coils wound both clockwise and counterclockwise around teeth of a back iron. Pairs of the coils are electrically connected in parallel.

5 Claims, 7 Drawing Sheets

BRUSHLESS MOTOR SYSTEM FOR A VEHICLE FUEL PUMP

BACKGROUND

1. Field of the Invention

The invention relates to brushless motor systems for vehicle fuel pumps.

2. Discussion

In a conventional DC motor, stationary brushes contact a set of electrical terminals on a rotating commutator. This contact forms an electrical circuit between a DC electrical source and armature coil-windings. The brushes and commutator form a set of electrical switches, each firing in sequence. Electrical power flows through the armature coil closest to the stator.

Conventional fuel pumps for E-85 fuel, i.e., a mixture of up to 85% fuel ethanol and gasoline by volume, include brushed DC motors. Brushes of these motors are susceptible to electrochemical deposition of ions when operating in E-85 fuel. This electrochemical deposition increases the resistance of the motor, which may slow the armature speed, resulting in a reduction of the flow rate of the pump.

A brushless DC motor is an AC synchronous electric motor. Permanent magnets of a rotor rotate relative to a wound stator. An electronic controller distributes power via a solid-state circuit. As power passes through the windings, the induced magnetic field in the windings reacts with the field in the rotor to create mechanical rotation. This mechanical rotation is harnessed via an impeller and pumping chamber in a fuel pump to create desired hydraulic pressure and flow.

Conventional neodymium compression bonded ring magnets used in brushless DC motors soften and come apart when submerged in E-85 fuel. This may result in a locked rotor condition of the motor.

Slot fill is a measure of the percentage of open space of a cross section of a lamination which is filled with copper windings. Conventional winding techniques require thicker wires to achieve desired stator resistance. These thicker wires limit achievable slot fill because the wires bow out from the lamination during winding.

SUMMARY

A stator for a brushless motor includes coils. The coils may be wound both clockwise and counterclockwise around teeth of a stator. Pairs of the coils are electrically connected in parallel. As disclosed, each wire is wound clockwise around a first tooth to form a first coil and is wound counterclockwise around a second tooth to form a second coil.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
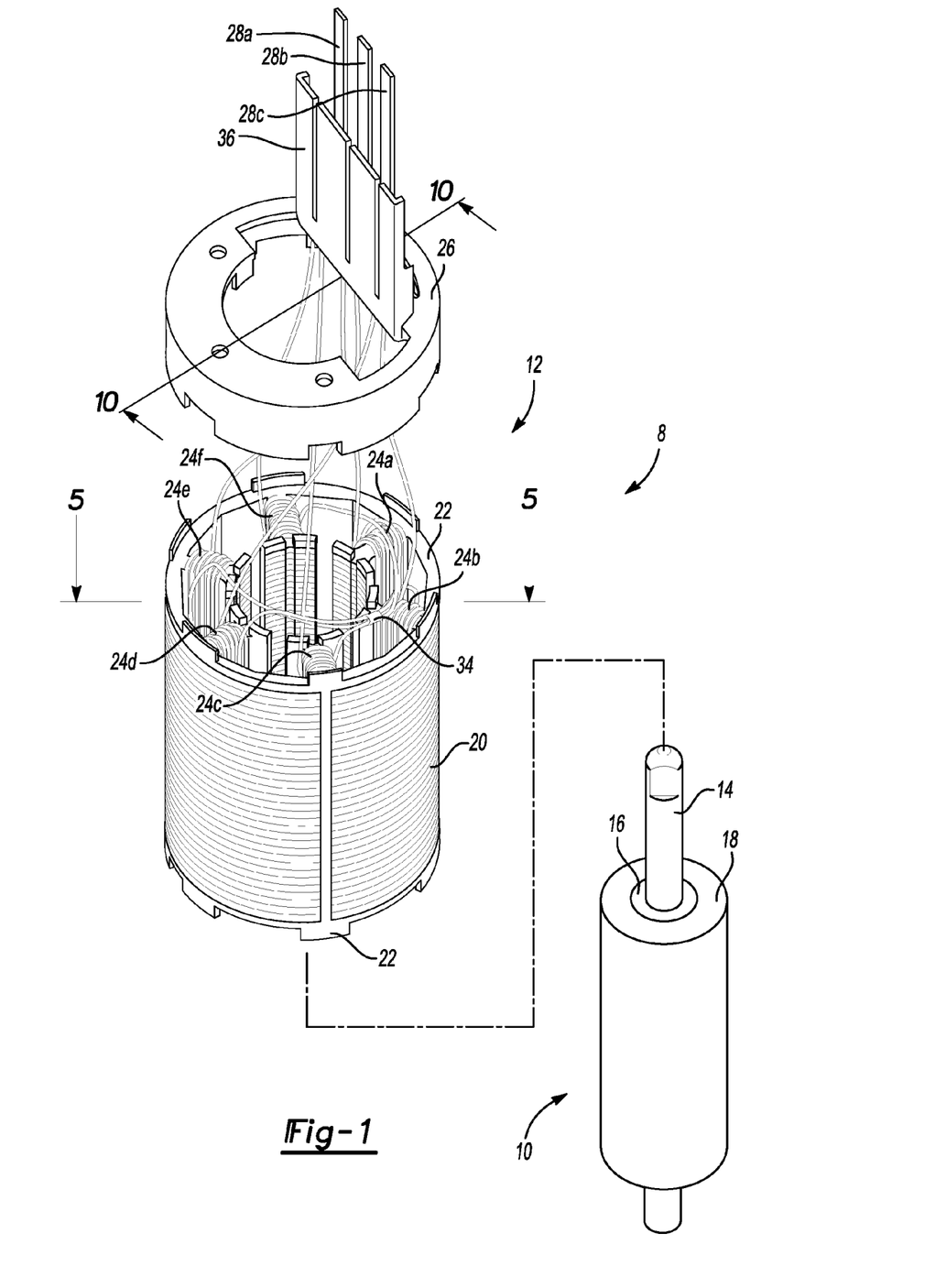
FIG. 1 is an exploded perspective view of an exemplary brushless DC electric motor.

FIG. 1 is an exploded perspective view of an exemplary brushless electric motor 8. The motor 8 includes a rotor 10 and a stator 12. The rotor 10 rotates relative to the stator 12 to convert electrical power to mechanical power.

The rotor 10 includes a shaft 14, core 16 and ring magnet 18. In the example of FIG. 1, the shaft 14 is made of stainless steel and the core 16 is made from powered iron. The ring magnet 18 is made from a magnetic powder, preferably a rare-earth magnet powder, compression bonded with a high functionality thermoset resin formulation utilized as a binder. As an example, neodymium-iron-boride may be compression bonded with an epoxy novalac resin formulation. As another example, neodymium-iron-boride may be compression bonded with a phenol-formaldehyde resin formulation. Other configurations and materials may also be used. The ring magnet 18 of FIG. 1 has a residual flux density, Br, in the range of 0.68-0.72 Tesla. Residual flux densities may range from 0.59 to above 0.72 Tesla.

Functionality defines the number of reactive sites available for formation of chemical bonds (or cross-links) between, for example, the epoxy resin molecules during the curing or thermosetting process. The formation of a three dimensional chemical structure by chemical cross-linking imparts the physical, chemical, and mechanical properties to the cured resin formulation. The higher cross-link densities provided by high functionality thermoset resins, such as epoxy resins, typically provide greater chemical resistance, higher mechanical stiffness, and higher thermal stability in the cured resin formulation.

The functionality of an epoxy resin is typically reported as epoxide equivalent weight (EEW) which is defined as the number of grams of material containing one gram equivalent of reactive epoxide group. Resins with smaller values for EEW contain higher epoxide levels and are of higher functionality. Individual high functionality resins typically possess an EEW of less than 200. High functionality, as used herein, refers to an EEW of less than 200.

Unlike conventional rotors coated with organic, inorganic or metallic coatings to protect them from corrosion, the rotor 10 is uncoated. Compression bonding the magnetic powder with the thermoset resin effectively surrounds the particles of the magnetic powder and protects them from corrosion due to exposure to aggressive fuels, such as E-85 ethanol.

Figure 2:
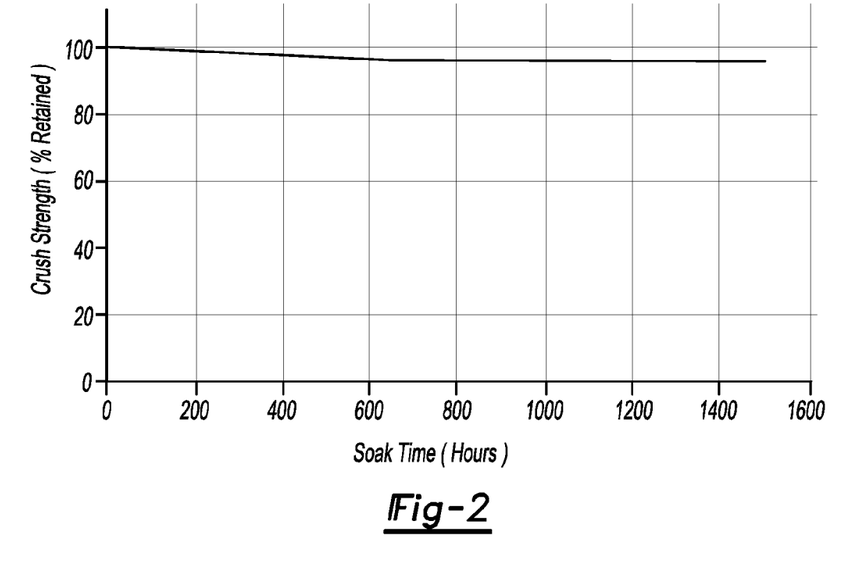
FIG. 2 is an exemplary plot of crush strength versus soak time for a high functionality epoxy resin binder.

FIG. 2 is an exemplary plot of material crush strength versus soak time for the high functionality thermoset resin of the ring magnet 18. The retained material crush strength of the high functionality thermoset resin of the ring magnet 18, i.e., the material crush strength after 1,500 hours of soak time in E-85 ethanol at 60 degrees Celsius, is about 95%. In performing this testing of the retained material crush strength, a compression tester applies a compressive load to a 14 Millimeter×15 Millimeter×4 Millimeter sample. The compressive load is increased until the top and bottom of the tester heads measurably displace relative to one another, i.e., until the sample crushes. This process is repeated three times. Further samples are soaked in E-85 ethanol at 60 degrees Celsius. Every 500 hours, samples are removed and tested as described above. Initially, the high functionality thermoset epoxy resin of the ring magnet 18 crushed at about 80,000 Newtons. After 1,500 hours, the high functionality thermoset epoxy resin of the ring magnet 18 crushed at about 76,000 Newtons.

Referring to FIG. 1, the stator 12 includes a back iron 20, end caps 22, coils 24a-24f, adaptor ring 26, and terminals 28a-28c.

Figure 3:
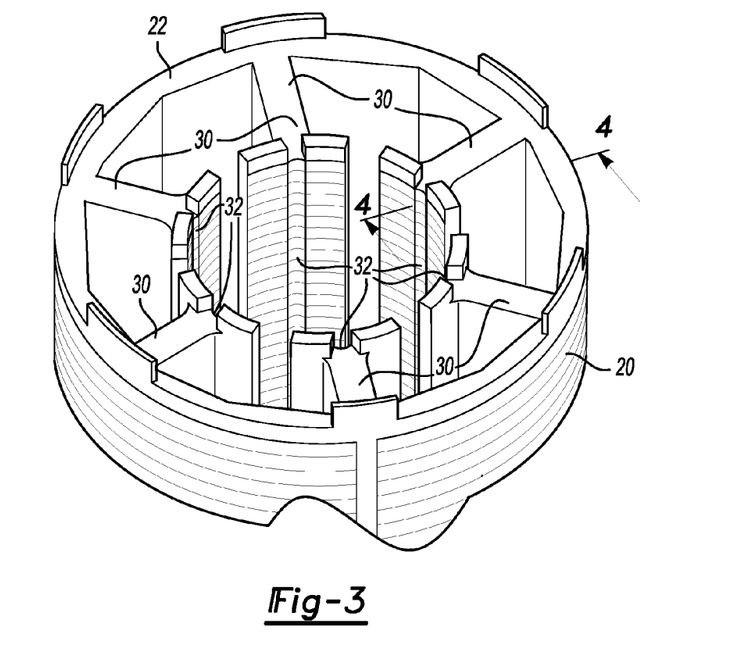
FIG. 3 is a perspective view of a portion of the back iron and end cap of FIG. 1.

FIG. 3 is a perspective view of a portion of the back iron 20 and end cap 22. The back iron 20 includes teeth 30. Coils 24a-24f (not shown) are formed around teeth 30.

Figure 4:
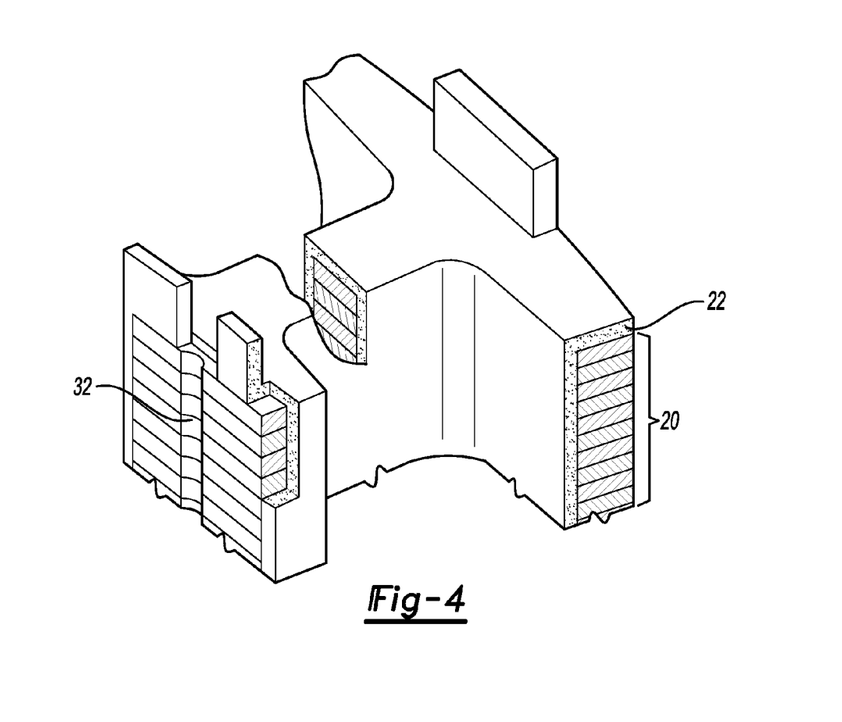
FIG. 4 is an enlarged perspective view, in cross-section, of the back iron and end cap of FIG. 3 taken along line 4-4 of FIG. 3.

FIG. 4 is an enlarged perspective view, in cross-section, of the back iron 20 and end cap 22 taken along line 4-4 of FIG. 3. The back iron 20 of FIG. 4 is made from a series of stamped sections bonded together via interlock lamination. The end cap 22 of FIG. 4 is insert molded with the back iron 20 using, for example, a high temperature nylon plastic. In alternative embodiments, the back iron 20 and end cap 22 may be manufactured in any desired fashion. For example, the back iron 20 may be cast in several pieces and assembled. Each of the teeth 30 include an anti-cogging notch 32 to reduce the tendency of the rotor 10 to cog while rotating relative to the stator 12.

Figure 5:
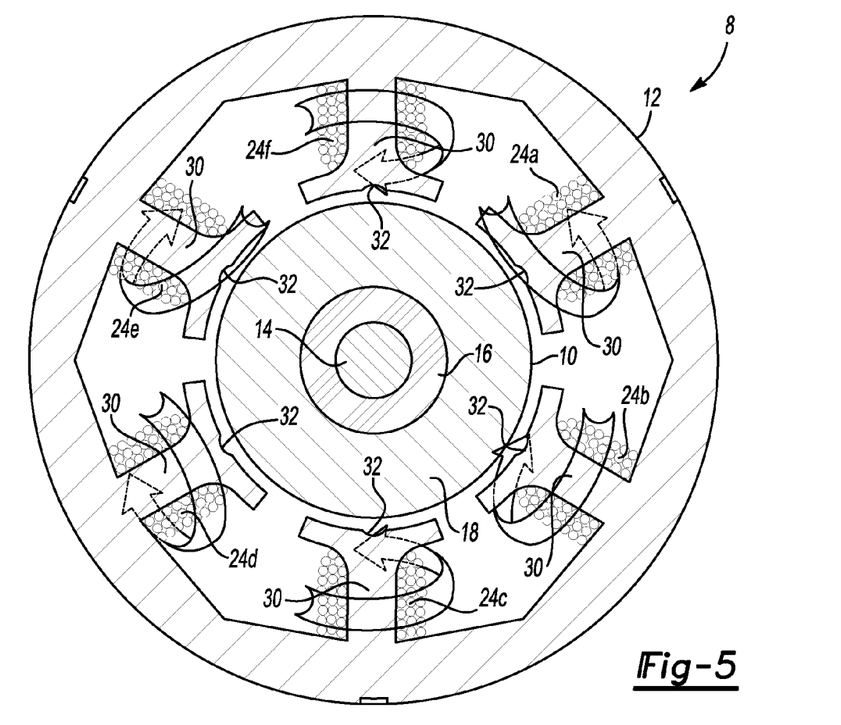
FIG. 5 is a plan view, in cross-section, of the stator of FIG. 1 taken along line 5-5 of FIG. 1.

FIG. 5 is a plan view, in cross-section, of the motor 8 taken along line 5-5 of FIG. 1. Each of the coils 24a-24f is wrapped around a respective tooth 30 of the back iron 20. In the embodiment of FIG. 5, some of the coils 24a-24f are wrapped clockwise (as indicated by arrow looking radially outward from the center of the motor 8), while other of the coils 24a-24f are wrapped counterclockwise (again, as indicated by arrow looking radially outward from the center of the motor 8).

Figure 6:
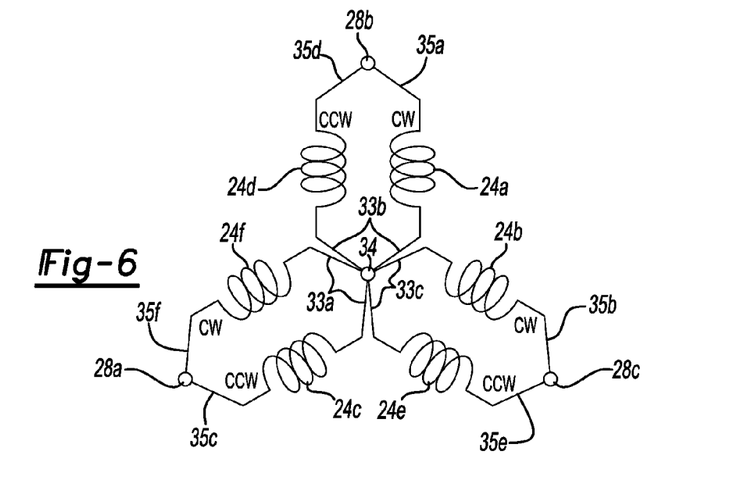
FIG. 6 is a schematic representation of the windings of FIG. 1.

FIG. 6 is a schematic representation of the coils 24a-24f. The coils 24a-24f are shown in a wye configuration. Delta configurations are also possible. Coils 24a and 24d are electrically connected in parallel and electrically connected with the terminal 28b. Coils 24b and 24e are electrically connected in parallel and electrically connected with the terminal 28c. Coils 24c and 24f are electrically connected in parallel and electrically connected with the terminal 28a. Coils 24a, 24b and 24f are wound clockwise. Coils 24c, 24d and 24e are wound counterclockwise. This electrical configuration permits the use of higher gauge wires and an increased number of windings to achieve desired motor performance. As a result, this electrical configuration allows for increased slot fill.

In the embodiment of FIG. 6, coils 24a and 24d are formed from a continuous wire, coils 24b and 24e are formed from another continuous wire, and coils 24c and 24f are formed from yet another continuous wire. This continuous wire configuration reduces the number of free ends 35a-35f associated with the coils 24a-24f. Therefore, relatively few connections are necessary. In alternative embodiments, the coils 24a-24f may be formed from individual wires. This individual wire configuration would increase, e.g., double, the number of free ends associated with the coils 24a-24f.

Each of the wires has a respective interpole section 33a-33c. Coils 24a-24f are electrically connected at crimp 34 (see FIG. 1).

Figure 7:
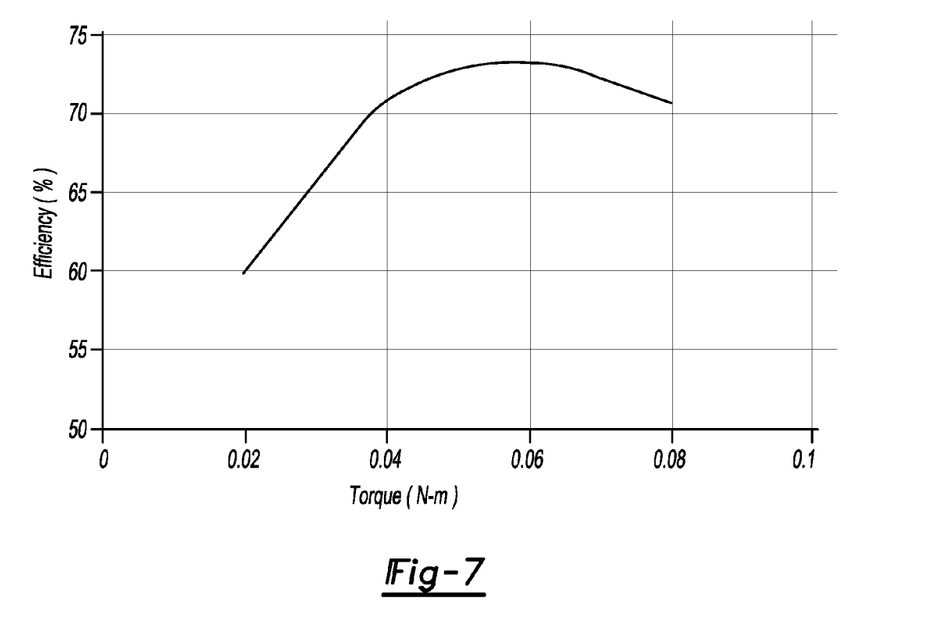
FIG. 7 is an exemplary plot of efficiency versus torque for the motor of FIG. 1.

FIG. 7 is an exemplary plot of efficiency versus torque, at 12 volts, for the motor 8. In the example of FIG. 7, the stator 12 has 22 turns at 20.5 American Wire Gauge. In alternative embodiments, other turns and gauges may be used, e.g., 20 turns at 20 American Wire Gauge, 30 turns at 22 American Wire Gauge, etc. The plot of FIG. 7 shows efficiencies between 60 and 75 percent for a range of torques from 0.02 to 0.08 Newton-Meters. Efficiency peaks around 0.06 Newton-Meters.

Figure 8:
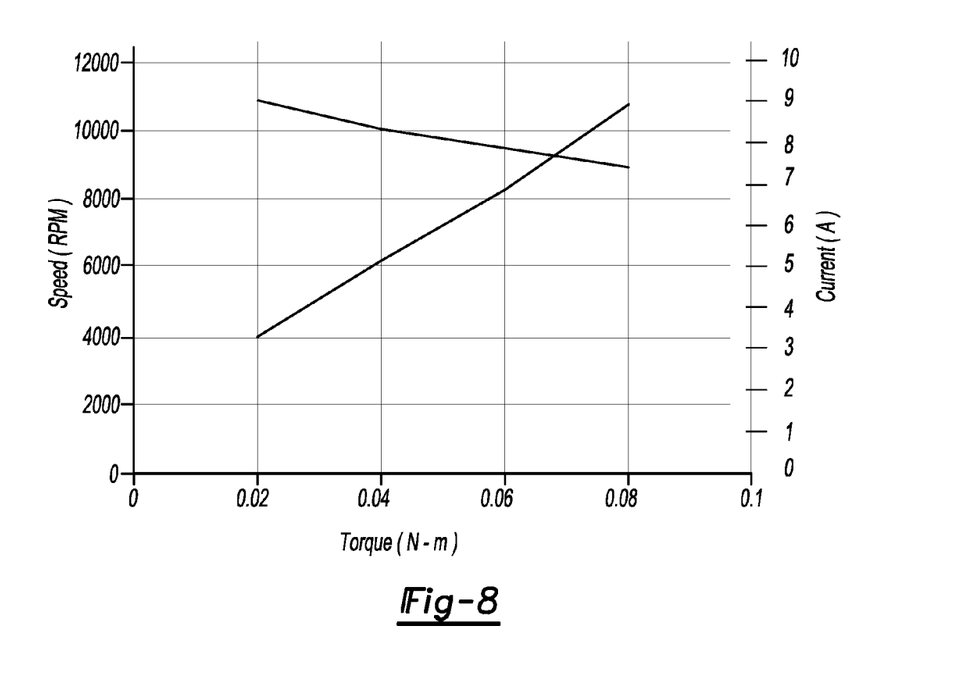
FIG. 8 is an exemplary plot of speed and current versus torque for the motor of FIG. 1.

FIG. 8 is an exemplary plot of speed and current versus torque, at 12 Volts, for the motor 8. In the example of FIG. 8, the stator 12 has 20 turns at 20 American Wire Gauge. In alternative embodiments, other turns and gauges may be used, e.g., 22 turns at 20.5 American Wire Gauge. The plot of FIG. 8 shows speeds between 11,000 and 9,000 revolutions per minute and currents between 3 and 9 Amps for a range of torques from 0.02 to 0.08 Newton-Meters.

Figures 9, 10:
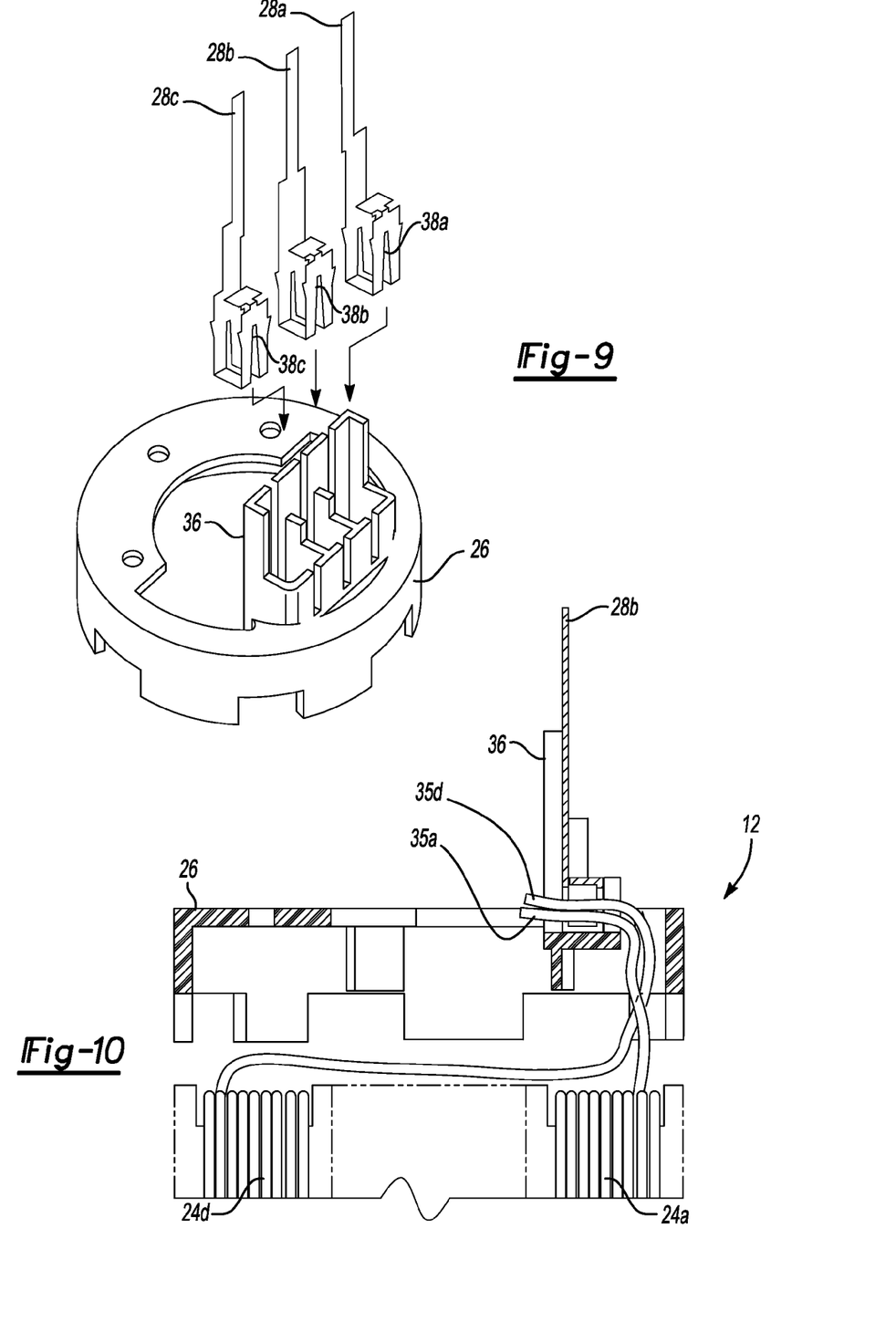
FIG. 9 is an exploded perspective view of the adaptor ring and terminals of FIG. 1.
FIG. 10 is a side view, in cross-section, of a portion of the stator of FIG. 1 taken along line 10-10 of FIG. 1.

FIG. 9 is an exploded perspective view of the adaptor ring 26 and terminals 28a-28c. Terminals 28a-28c set within a tower portion 36 of the adaptor ring 26. Terminals 28a-28c each include a respective slot portion 38a-38c which receives and retains the free ends 35a-35f (FIG. 6) of the coils 24a-24f.

FIG. 10 is a side view, in cross-section, of a portion of the stator 12 taken along line 10-10 of FIG. 1. Free ends 35a and 35d associated with coils 24a and 24d electrically connect with the terminal 28b, preferably through a solderless connection using an insulation-displacement terminal 28b. Similar connections are made for free ends 35b and 35e and the terminal 28c and free ends 35c and 35f and the terminal 28a.

Figure 11:
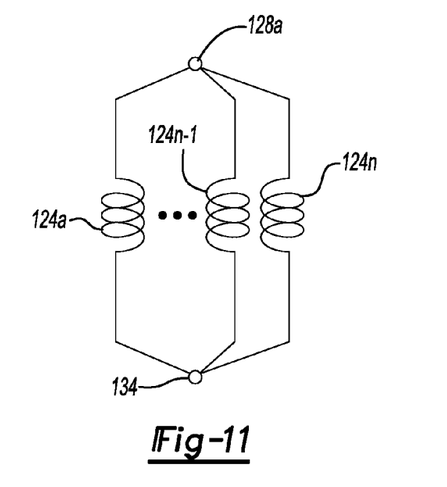
FIG. 11 is a schematic representation of windings of a leg of an exemplary stator.

FIG. 11 is a schematic representation of coils 124a-124n of a leg of a stator. Numbered elements differing by 100 have similar, although not necessarily identical, descriptions. This leg may be used in a wye or delta winding pattern. Coils 124a-124n may be formed from a continuous wire. At least one of the coils may have a wind direction opposite the others. For example, for 3 coils, coils 124a and 124c may be wound clockwise. The coil 124b may be wound counterclockwise. Other winding configurations are also possible. Some or all of the coils 124a-124n may be formed from individual wires. Some or all of the coils 124a-124n may have the same wind direction. For example, for 3 coils, the coils 124a-124c may be wound counterclockwise. Other winding configurations are also possible.

Figure 12:
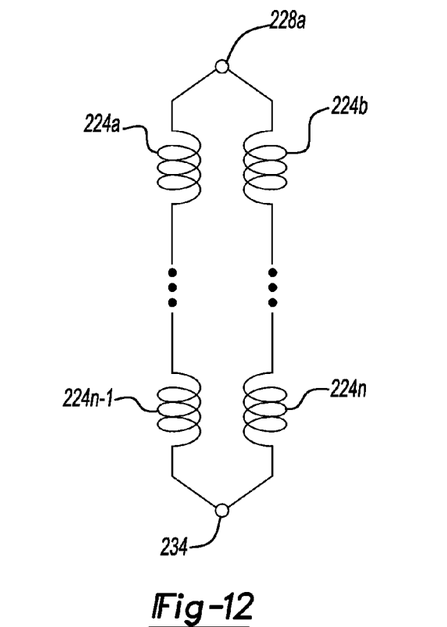
FIG. 12 is another schematic representation of windings of a leg of an exemplary stator.

FIG. 12 is a schematic representation of coils 224a-224n of a leg of a stator. This leg may be used in a wye or delta winding pattern. Coils 224a-224n may be formed from a continuous wire. At least one of the coils may have a wind direction opposite the others. For example, for 4 coils, coils 224a and 224c may be wound clockwise. Coils 224b and 224d may be wound counterclockwise. Other winding configurations are also possible. Some of the coils 224a-224n may be formed from individual wires. Some or all of the coils 224a-224n may have the same wind direction. For example, for 4 coils, coils 224a and 224c may be wound counterclockwise. Coils 224b and 224d may be wound clockwise. Other winding configurations are also possible.

Figure 13:
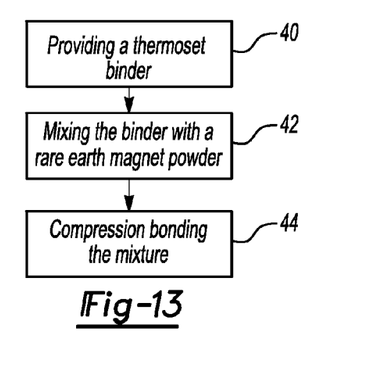
FIG. 13 is a flow chart of a method of forming a ring magnet for a rotor of a brushless motor.

FIG. 13 is a flow chart of a method of forming a ring magnet for a rotor of a brushless motor. At 40, a high functionality thermoset binder, e.g., epoxy resin, is provided. At 42, the high functionality thermoset binder is mixed with a rare earth magnet powder, e.g., a neodymium-iron-boride powder. At 44, the mixture is compression bonded to form a ring magnet for a brushless motor.

Figure 14:
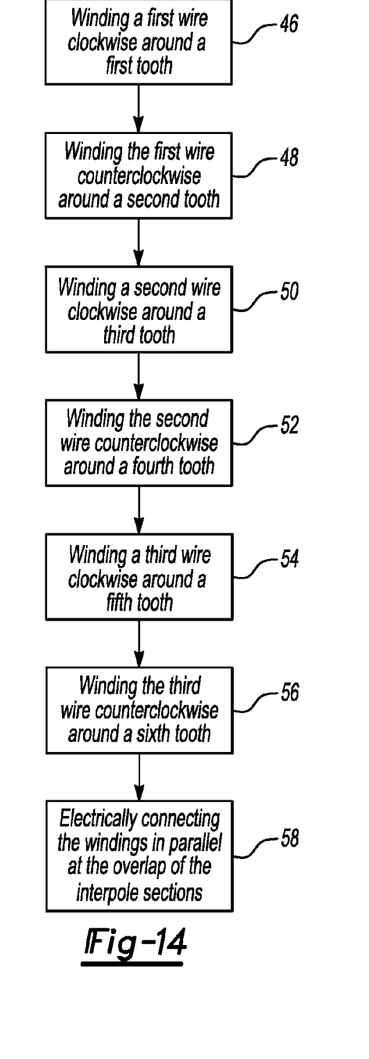
FIG. 14 is a flow chart of a method for manufacturing a stator having a plurality of teeth.

FIG. 14 is a flow chart of a method for manufacturing a stator having a plurality of teeth. At 46, a first wire is wound clockwise around a first tooth. At 48, the first wire is wound counterclockwise around a second tooth. At 50, a second wire is wound clockwise around a third tooth. At 52, the second wire is wound counterclockwise around a fourth tooth. At 54, a third wire is wound clockwise around a fifth tooth. At 56, the third wire is wound counterclockwise around a sixth tooth. At 58, the windings are electrically connected in parallel at the overlap of interpole sections of the first, second and third wires.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive brushless electric motor system comprising:
    a stator including a plurality of pairs of windings, each of the pairs of windings (i) formed from a continuous wire having no more than one interpole common electrical connection and (ii) electrically connected in parallel, wherein one of the windings of each of the pairs of windings has a clockwise wind direction and the other of the windings of each of the pairs of windings has a counterclockwise wind direction, wherein the interpole common electrical connections are fused together at a common location, and wherein a magnetic field is generated when electrical current flows through the windings; and
    a rotor being configured to rotate in response to the generated magnetic field.

2. The system of claim 1 wherein each of the pairs of windings has no more than two free ends.

3. An automotive brushless electric motor system comprising:
    a stator including a plurality of pairs of windings, each of the pairs (i) formed from a continuous wire having no more than one interpole common electrical connection and (ii) electrically connected in parallel, wherein the interpole common electrical connections are fused together at a common location; and
    a rotor operatively arranged with the stator.

4. The system of claim 3 wherein each of the pairs of windings has no more than two free ends.

5. The system of claim 3 wherein one of the windings of each of the pairs of windings has a clockwise wind direction and the other of the windings of each of the pairs of windings has a counterclockwise wind direction.

* * * * *